U. C. TAINTON & M. F. L. A. AYMARD.
ELECTROLYTIC RECOVERY OF METALS FROM THEIR SOLUTIONS AND IN APPARATUS THEREFOR.
APPLICATION FILED NOV. 14, 1914.

1,231,967.

Patented July 3, 1917.

Witnesses:
Chas. Ovendale.
A. Thompson

Inventors:
Urlyn Clifton Tainton
Malcolm Forster Lambe Aymé Aymard

UNITED STATES PATENT OFFICE.

URLYN CLIFTON TAINTON AND MALCOLM FOERSTER LAMBE AYMÉ AYMARD, OF JOHANNESBURG, TRANSVAAL, SOUTH AFRICA.

ELECTROLYTIC RECOVERY OF METALS FROM THEIR SOLUTIONS AND IN APPARATUS THEREFOR.

1,231,967. Specification of Letters Patent. Patented July 3, 1917.

Application filed November 14, 1914. Serial No. 872,132.

*To all whom it may concern:*

Be it known that we, URLYN CLIFTON TAINTON, B. Sc., and MALCOLM FOERSTER LAMBE AYMÉ AYMARD, both subjects of the King of Great Britain, and residents of Johannesburg, Transvaal Province, Union of South Africa, have invented certain new and useful Improvements in the Electrolytic Recovery of Metals from Their Solutions and in Apparatus Therefor, of which the following is a specification.

This invention consists of improvements in the electrolytic process of recovering metals from their solutions, and of improvements in apparatus for carrying out the improved process.

The object of the invention is to effect a more rapid extraction of the metal, and especially to obtain the metal in a form more convenient for subsequent handling and refinement.

Our invention comprehends the use of an electrode of improved construction, as well as the means for and method of using the same.

According to this invention the electrode is made of porous metal, or comminuted metal, or other porous or comminuted conducting substance, or a combination of the same; and it is so arranged that all the solution to be electrolyzed is caused to flow through the interstices or pores in the electrode, which is connected to the negative pole of a dynamo or other source of electric current.

The cathode is preferably constructed so that the pores or interstices through which the metal bearing solution is caused to flow are of very small size or diameter (say decimal point naught, naught four—.004—of an inch, or less), as we have discovered that the speed or rapidity of the extraction depends directly upon the closeness of the contact or proximity between the solution and the material of the electrode.

The use of a cathode of the nature described occasions considerable resistance to the flow through it of the solution, which renders it necessary to force said solution through the cathode by means of a difference in pressure.

In practice a difference in pressure equal to a pressure head of twenty (20) to one hundred and fifty (150) feet of water is found most satisfactory.

The cathode in a convenient form consists of a porous conducting support upon which a coating, covering or cake of the comminuted conducting material is deposited out of a liquid carrying said material in suspension, by passing the liquid through said support. After the cake has been formed the solution is passed through it and the metal contents of the solution thereby precipitated thereon. After the precipitation has been carried out to the desired extent, the cake, together with the metal deposited thereon, is detached or removed from the porous conducting support by suitable mechanical means, such as washing or sluicing, scraping or other equivalent operation.

The material of the cake after being detached from the porous conducting support may be subjected to a process of classification or concentration in order to separate the portion which carries the precipitated metal.

We have found it convenient to make the porous conducting support upon which the cake is to be formed, of a pervious base, such as filter cloth, stretched on a suitable rigid support from which the liquid may escape. The base is covered with a metallic conductor which is permeable to the solution, such as a sheet of wire gauze or perforated metal plate; this conductor being attached closely by stitching or other means to the pervious base. As an alternative, this porous conducting support may be made of a textile fabric of which a number of the threads are of a metallic nature, in order to obtain the requisite conductivity over the surface. The close contact between the pervious base and the metallic conductor obviates the difficulty which otherwise arises due to the separation of the base from the conductor by the comminuted conducting material.

This invention is found especially suitable for precipitating the gold contained in the dilute aurocyanid solutions obtained in leaching gold ores. When this is effected by ordinary electrolytic means, such as the method of Siemens-Halske, the time required for precipitation is considerable, usually about ten (10) hours for an eighty per cent. (80%) extraction. This is mainly due to the fact that the aurocyanogen ions from which the gold is to be precipitated tend, under the action of the electric current, to drift away from the cathode on which they are to be deposited. This fact, coupled with the extreme scarcity of the aurocyanogen ions, very quickly removes these ions from close proximity to the cathode, and the deficiency can be replaced only by the comparatively slow process of diffusion and circulation of the electrolyte. This results in the very slow precipitation mentioned.

By the adoption of this invention, however, every aurocyanogen ion in passing through the porous electrode must pass within a maximum distance from the material of the cathode of half the diameter of the pores or interstices, and this distance may be made as small as desired by diminishing these interstitial spaces. This, coupled with the high potential applied, insures very rapid and complete precipitation. In practice ninety nine per cent. (99%) of the gold in a solution containing three penny weights (3 dwts.) per ton may be precipitated in a single passage of the solution through the electrode, occupying under five (5) seconds.

In the accompanying drawings, we illustrate suitable apparatus for carrying out the process.

In the apparatus the alternate anode and cathode elements are coöperatively combined in a manner analogous to that of a known type of filter press. Any suitable number of cathodes disposed intermediate the anodes, may be employed. All the cathodes are constructed in the same manner and are connected together electrically in parallel; and all the anodes are also alike in construction and connected in like manner. It will consequently suffice to describe the construction and arrangement of one cathode and one anode and the various other coöperating elements of the apparatus.

Figure 1:
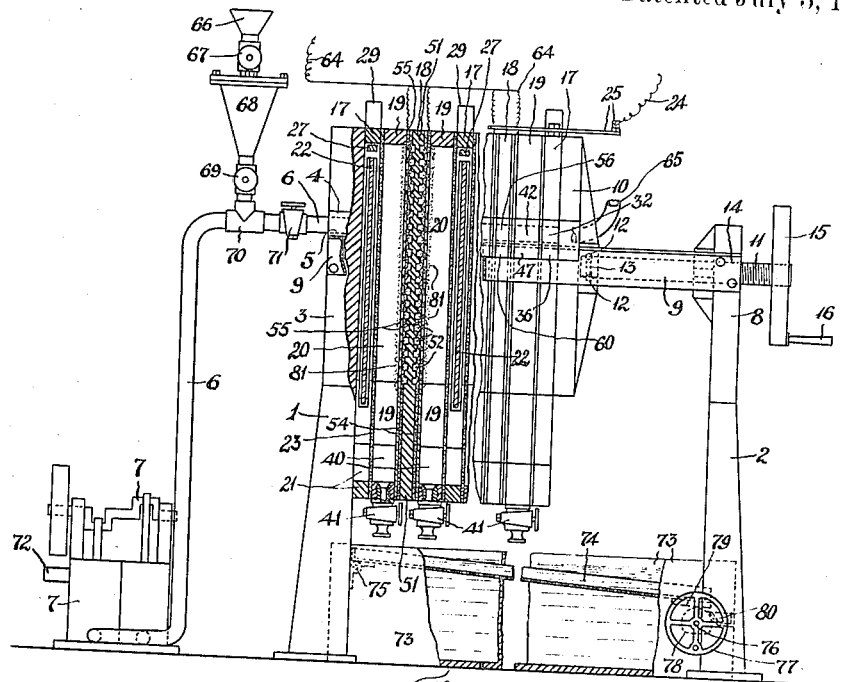
Figure 1 is a part-sectional side elevation of the complete apparatus.
Figures 2, 3, 4:
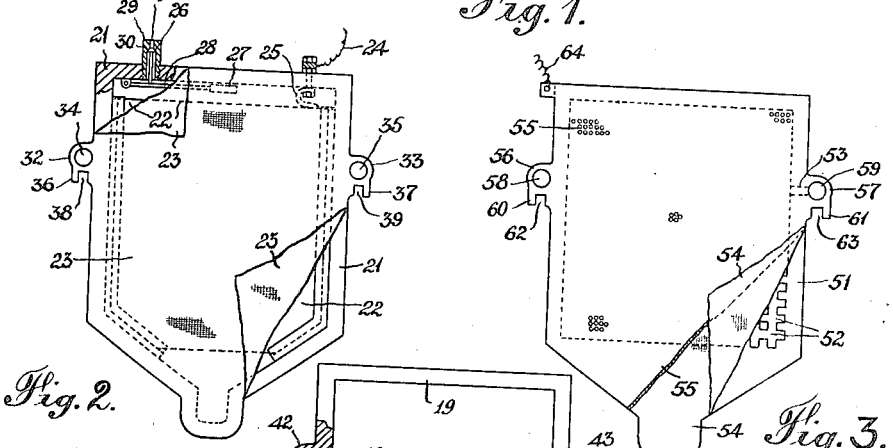
Fig. 2 is a side part sectional elevation of one of the anode elements, detached.
Fig. 3 is a side part sectional elevation of one of the cathode elements, detached.
Fig. 4 is a side part sectional elevation of one of the distance frames or members which are placed intermediate the anode and cathode elements.

In Figs. 1, 1, 2 designate the standards positioned at opposite ends of the apparatus. The standard 1 carries or is formed in one piece with a plate 3 which forms one end of the press. This plate is constructed on the one side with a lug 4 through which is formed a hole 5, which hole forms the inlet to the press and has connected to it one end of the delivery pipe 6 of the pressure pump 7. To the sides of the plate 3 and member 8 of the standard 2, there are fixed horizontal members 9 which form supporting slide rails for the various leaves or elements of the press. 10 is the plate which forms the other end of the press. This plate 10 is constructed to receive one end of a screw 11 which is revolubly attached to it by means of pins 12 which work in an annular groove 13 in, and near the end of the screw. The screw is adapted to be screwed through a nut or interiorly threaded hole 14 in the upper end of portion 8 of the standard. 15 is a hand wheel and 16 a handle for rotating the screw 11 in either direction to move the plate 10 in either a backward or forward direction in order to open or close the press.

The elements of the press between the plates 3, 10, comprise anode elements 17, intermediate cathode elements 18 and distance frames 19 placed between the anodes and cathodes which form the chambers 20 in which the solution is received before it passes through the cathodes.

As previously explained all the anode elements are of similar construction; one being illustrated in Fig. 2. Each anode element, as shown, comprises a framework 21 of metal or other suitable rigid material. This framework is provided on the inside with grooved insulating strips which support between them the anode or sheet of peroxidized lead or the like 22. Both sides of the frame 21 and sheet 22 are covered by means of pieces of filter cloth 23 which form porous diaphragms between the sides of the anode and the adjacent cathodes. In the case of the end anode the piece of filter cloth may be provided only on that side adjacent the cathode. The pieces of filter cloth are preferably cut of the same shape as the frame 21 so that they serve to form a water tight joint between the sides of the frame and the distance frames 19. Alkaline sulfate or other solution—to prevent disintegration of the material of the anodes—is placed in the space inclosed by the frame 21 and the pieces of filter cloth 23 in which space the anode sheet of peroxidized lead 22 is arranged. 24 represents the conducting wire for conveying the current to the anode and 25 are the connections between said wire and the sheet 22. Each of the frames 21 is provided with a valve 26 which is attached to the top of the frame 21 and provided for the purpose of allowing of the escape from the interior of the frame of the evolved oxygen. This valve is automatically opened and closed by means of a float 27 operating a lever 28 to which the valve 26 is attached. The valve casing 29, which is shown screwed into the top of the frame 21, provides the valve seating 30 and the outlet 31 leading to the open. When the level of the solution in the anode compartment falls, owing to the accumulation of the oxygen, the valve automatically opens to allow the oxygen to escape.

The employment of this valve prevents displacement of the solution from the anode compartment by the evolved oxygen and also prevents oxidation of the graphite of the cathode and consequent reduction of its efficiency for precipitation; while the separation of the anode from the metal bearing solution by means of the filter cloth 23 prevents decomposition of the cyanid by the anode reaction.

The frame 21 is provided at both sides with lugs or projections 32, 33 in which are provided holes 34, 35, the one 34 forming part of the inlet passage into the press for the solution and the other 35 part of the outlet passage from the press for the barren solution after it had passed through the cathodes. The lugs 32, 33 are provided with downwardly projecting lips 36, 37 which form recesses 38, 39 to receive the upper portions of the supporting slide rails 9.

One of the distance frames 19, which are placed intermediate the anode frames 21 and the cathode frames, is shown in Fig. 4. These frames are constructed in their lower portions to form a well 40 and in the frame at the bottom there is provided a draw off cock 41 for the purpose of removing the cake or coating of graphite or other conducting substance, together with the metal precipitated thereon, after it has been detached from the surface of the cathode. These frames 19, which are made of suitable rigid preferably non-conducting material, are constructed at both sides with lugs 42, 43, which have holes 44, 45 formed through them which holes form portions of the inlet and outlet passages for the solution. The holes 44, 45 coincide with the holes 34, 35 in the anode frames 21. A passage 46 is formed from the hole 44 to the inside of the frame 19 to allow the solution to pass into the chamber 20. The lugs 42, 43 are formed with lips 47, 48, which form the recesses 49, 50 to engage the bars 9 in order to support the distance frames in proper position relative to the anode and cathode frames.

Each of the cathodes, as shown in Fig. 3 comprises a piece or plate 51 of metal or other suitable material the surfaces of which are grooved or corrugated as indicated at 52, to allow the barren solution to pass to the outlet 53. The plate is covered at each side with a piece of filter cloth 54 which pieces are preferably made of the same shape as the plate; and over each of the pieces or filter cloth is placed a perforated plate or piece of wire gauze or the like 55. The plate 51 of the cathode is constructed with lugs 56, 57 in which are formed holes 58, 59 which form portions of the inlet and outlet passages, and with lips 60, 61 forming the recesses 62, 63 in which fit the upper portions of the slide rails 9. The outlet 53, as shown, communicates with the hole 59 which forms portion of the outlet passage for the barren solution. 64 represents the electrical conducting wires to the various cathodes which are connected to the perforated plate or piece of wire gauze or the like 55. All the cathodes are connected together electrically in parallel similar to the various anodes intermediate them.

When the various elements of the press, that is to say the anode elements, cathode elements and the distance frames which are interposed between them, are placed in position, the holes 34, 58, 44 on the one side coincide, thereby forming a passage extending on the one side of the press from the hole 5 to plate 10, from which passage the metal bearing solution passes through the holes 46 in each of the distance frames 19 into the several compartments 20. The holes 35, 59, 45 at the other side also coinciding, a continuous passage is formed on the other side of the press from plate 3 to and through plate 10, into which passage the barren solution passes through the holes 53 in the several cathode plates. 65 is a flexible or other suitable pipe connection through which the barren solution is removed from the outlet side of the apparatus.

The apparatus may comprise any desired number of the anodes and intermediate cathodes and the distance frames separating them. The several elements, after having been arranged in position on the slide rails, are forced tightly together by means of the screw 11 to form liquid tight joints between them, in a manner that will be well understood on reference to Fig. 1.

For introducing the comminuted graphite or other conducting substance into the solution entering the chambers 20, we provide a hopper 66 which is provided at the bottom with a valve 67. The hopper 66 through valve 67 can be placed in communication with an intermediate receiving vessel 68, which latter can be placed in communication with the delivery pipe 6, from the pump, through the medium of the valve 69 and T piece 70.

71 is a valve provided in the delivery pipe 6 near the press, for closing said pipe when the passage of the solution through the press is to be discontinued.

72 is a pipe which conveys the metal bearing solution to the pump 7.

Beneath the valves 41 of the various distance frames 19 we arrange the means for subjecting the material of the cake, after it has been detached from the porous conducting support, to a process of classification, for effecting the separation of that portion which carries the precipitated metal. We have found the deposited metal forms with the surface graphite or other material a crust which can be readily separated from the comminuted material of the cake by a process of screening or classification. The means illustrated for accomplishing this comprise a tank 73 located between the standards and beneath the outlets of the several valves 41; in which tank is arranged an inclined perforated tray 74 hinged at its upper end as indicated at 75. Across the lower end of the tank is journaled a shaft 76 on the outer end of which is fixed a hand wheel 77. On the shaft 76 inside the tank is fixed a cam 78 which is adapted to engage the underside of the lower and free end of the tray 74 and to impart thereby a jigging or oscillatory motion. 79 is a wearing piece fixed to the underside of the tray for the cam 78 to engage with. 80 is a collecting trough into which is received that portion of the material which does not pass through the perforations in the tray, which portion carries the precipitated metal. The tank is filled with water to a suitable level above the top of the tray.

In the operation of this form of the apparatus a supply of solution is admitted through pipe 72 to the pump and by the latter pumped through the delivery pipe 6 into the compartments 20 of the press. The comminuted graphite or other conducting substance is placed in the hopper 66 and valve 69 is closed and valve 67 opened which allows said material to pass into the vessel 68. Valve 67 is then closed and valve 69 then opened which allows the material to pass gradually from vessel 68 into the solution flowing to the press through pipe 6. The coatings, coverings or cakes and the conducting material are deposited out of the solution on to the surfaces of the several cathodes as indicated at 81. Either metal-bearing or barren solution may be used for forming the cakes on the cathodes. If metal-bearing solution is used then it may be returned to the pump and re-circulated through the press to insure the recovery of all the metal. The barren solution finally leaves the press at the outlet pipe 65. The precipitation of the metal out of the solution is continued for the desired length of time. When the cake of conducting material is to be detached from the cathodes the pump is stopped and the valve 71 is closed. The material of the cake when detached falls into the wells 40 and is withdrawn therefrom through the valves 41 and delivered on to the vibrating perforated tray 74. The material is then screened or classified to separate the more valuable portion which is received in the collecting trough 80 as previously explained. The material which passes through the perforations of the screen or tray is re-used to form fresh cakes. For continuing the process of treating the solution fresh cakes are then formed on the cathodes and the process of precipitation proceeded with until it is again desired to detach or remove the cakes from the cathodes.

Figure 5:
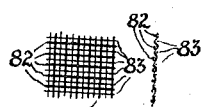
Fig. 5 shows two views of a modified form of the porous conducting support.

In Fig. 5 we illustrate the alternative construction of the porous conducting support. It takes the form of a textile fabric of which a number of threads 82 are of a metallic nature and are interwoven with the other fibrous threads 83. This insures the requisite conductivity over the whole surface of the fabric. As previously explained, the same result may be obtained by closely attaching a wire gauze or perforated metal plate to the filter cloth or other pervious base, as by stitching or cementing them together.

The advantage which will be derived from the use of the arrangement above described is that the solution is caused to flow over the surface of the cathode for some time before it actually passes through, with the result that more intimate contact of the solution with the cathode is obtained, giving a more complete precipitation.

The apparatus may be used in series in which case the solution after it has been passed through the cathode or cathodes of the one apparatus will be delivered to the pump of another apparatus, and be drawn or forced through the cathode or cathodes of said other apparatus, and so on throughout the whole series.

The comminuted conducting material used for the formation of the cathode is preferably of such a nature that it will not readily pack under normal working pressure. If there is any tendency for the conducting material to pack this can be minimized by temporarily reducing the pressure or applying a pressure of a fluctuating nature while the electrolyte is forced through it.

We have found that the tendency for the material to pack on the sheets of gauze can be obviated or minimized by using comminuted material of such a grade as will just pass the mesh of the gauze sheets used in the construction of the electrode.

We have also ascertained that when the metal bearing solution carrying the comminuted conducting substance of this grade in suspension is passed rapidly through the interstices of the gauze sheets, a bed or coating of said substance is formed thereon which offers over its entire surface a uniform resistance to the passage through it of the solution.

It will be obvious that if for example oxid of lead in a finely divided form be used as the conducting material for forming the bed, then it will be reduced to metallic lead by the action of the current, and that the gold may be obtained therefrom by direct cupellation.

What we claim as our invention and desire to protect by Letters Patent is:—

1. Apparatus for recovering metals from their solutions electrolytically comprising alternate anode and cathode elements, each cathode element comprising a porous conducting support, a coating of comminuted conducting material deposited on said support from a liquid carrying said material in suspension, means for passing the metal bearing solution through the pores or interstices of said comminuted conducting substance, and means for drawing off the comminuted conducting substance after it has been detached from said porous conducting support.

2. Apparatus for recovering metals from their solutions electrolytically comprising alternate anode and cathode elements which are separated by porous diaphragms, each cathode element comprising a porous conducting support, a coating of comminuted conducting material deposited from the metal bearing solution, means for adding the comminuted conducting substance to the inflowing metal bearing solution, means for passing the metal bearing solution through the pores or interstices of said comminuted conducting substance, means for effecting withdrawal of the comminuted conducting substance after it has been detached from said porous conducting support, and means for permitting of the escape of the evolved oxygen from the anode compartments.

3. The process of recovering metals from their solutions, which consists in passing the solution through a pervious electrode-support, initially adding to said solution comminuted conducting material until a coating thereof is deposited on said support, then passing the solution through said coating to electrolytically deposit the metal values thereon, detaching said coating with its precipitated metal, and treating the same to recover the metal.

4. The process of recovering metals from their solutions, which consists in passing a portion of the solution having in suspension therein comminuted conducting material through a pervious electrode-support until a coating of said material is deposited on said support, passing the solution and repassing said portion through said coating to electrolytically deposit the metal values thereon, detaching said coating with its precipitated metal from said support, and treating the same to recover the metal.

5. Apparatus for recovering metals from their solutions electrolytically, comprising alternate anode and cathode elements separated by porous diaphragms, each cathode element comprising a porous support having thereon a coating of comminuted conducting material deposited from the solution, means for adding the comminuted conducting material to the inflowing solution, means for passing the metal-bearing solution through the interstices of said coating, and means for withdrawing the comminuted conducting material after it has been detached from said porous support.

6. Apparatus for recovering metals from their solutions, comprising a closed pressure-cell having alternate spaced anode and cathode elements, each cathode comprising a pervious support having thereon a coating of comminuted conducting material, means for forcibly passing the solution through said coating, and means for withdrawing the comminuted coating with its adhering precipitated metal after it has been detached from said pervious support.

7. Apparatus for recovering metals from their solutions, comprising a closed pressure-cell having alternate spaced anode and cathode elements, each cathode comprising a pervious support having thereon a coating of comminuted conducting material deposited from the solution, means for adding said material to the inflowing solution, means for forcibly passing the solution through said coating, and means for withdrawing the comminuted coating with its adhering precipitated metal after it has been detached from said pervious support.

8. Apparatus for recovering metals from their solutions, comprising a closed pressure-cell having alternate spaced anodes and cathodes, said anodes and cathodes having plates provided with marginal bores registering when the plates are in operative alinement to form inlet and outlet passages for the solution, means for securing said plates in alinement, liquid-tight, to form anode and cathode compartments, inlet-ports connecting the inlet-passage with the interior of the cell, and outlet-ports connecting said cathode compartments with the outlet-passage.

In testimony whereof we have signed our names to this specification in the presence of two subscribing witnesses.

URLYN CLIFTON TAINTON.
MALCOLM FOERSTER LAMBE AYMÉ AYMARD.

Witnesses:
  CHAS. OVENDALE,
  A. THOMPSON.